Patented June 1, 1937

2,082,477

UNITED STATES PATENT OFFICE 2,082,477

SYNTHETIC TANS AND PROCESS OF PRODUCING THE SAME

Richard Alles, Mannheim, Germany, assignor to I. G. Farbenindustrie Aktiengesellschaft, Frankfort-on-the-Main, Germany No Drawing. Application March 27, 1936, Serial No. 71,335. In Germany April 6, 1935

20 Claims. (Cl. 149—5)

The present invention relates to synthetic tans and a process of producing the same.

It is already known that the condensation products derived from aromatic sulphonic acids of the benzene series which contain hydroxyl groups and aldehydes or ketones of low molecular weight are tanning agents. When used for tanning, they frequently yield leather, however, which is sensitive to light and this lessens the field of use of the said tanning agents for the preparation of high quality leather in spite of their otherwise good tanning properties.

I have now found that tanning agents which yield leather very stable to light can be obtained by acylating a condensation product of an aromatic hydroxy compound containing at least one sulphonic acid group and a carbonyl compound, such as an aldehyde or ketone of low molecular weight, with an organic acid free from olefinic bonds. As initial materials for the process according to this invention may be mentioned for example condensation products derived from phenol, cresol or xylenol sulphonic acids or sulphonic acids of hydroxydiaryl sulphones, and formaldehyde, acetaldehyde or acetone. The sulphonic acid groups of said compounds may also be attached to a side chain; compounds of this kind are for example the condensation products of phenols and aldehyde bisulphites. The said sulphonic acids may also contain substituents, as for example halogen atoms, ether, ester or nitro groups.

Especially suitable carboxylic acids for the acylation are saturated fatty acids of low molecular weight, such as acetic acid, propionic acid, butyric acid and valeric acid; benzoic acid, phthalic acid, terephthalic acid and naphthoic acids may also be used. The said carboxylic acids may frequently be employed with advantage in the form of their functional derivatives, as for example in the form of carboxylic acid chlorides, anhydrides or esters. Suitable sulphonic acids free from olefinic bonds are for example ethane, hydroxyethane, propane, hexane or dodecane sulphonic acids, benzene, toluene, xylene or naphthalene sulphonic acids and sulphopalmitic acid. The carboxylic or sulphonic acids may also contain substituents, as for example halogen atoms, nitro, amino, ether or ester groups.

In carrying out the process, the condensation products from said aromatic hydroxy compounds containing at least one sulphonic acid group and aldehydes or ketones, for example, may be first neutralized with caustic soda or caustic potash solution and then mixed with the acylating carboxylic or sulphonic acids, the acylation then being effected by heating, for example at temperatures from about 50° to about 150° C., if desired with an addition of known suitable condensing agents such as acids, alkalies or the like. The resulting reaction product may be employed for tanning after adjustment to the degree of acidity necessary for tanning. By means of the tanning agents thus obtainable it is possible to obtain well tanned leather of high plumpness, pale color and very good fastness to light.

Instead of acylating the finished tanning agent, the aromatic hydroxysulphonic acids employed for their preparation may be acylated and then subjected to condensation with the aldehydes or ketones, preferably under mild conditions.

The following examples will further illustrate how the present invention may be carried out in practice but the invention is not restricted to these examples. The parts are by weight.

*Example 1*

200 parts of 50 per cent solution, neutralized with caustic soda, of the condensation product derived from cresol sulphonic acid and formaldehyde is mixed with 50 parts of caustic soda of 36° Baumé strength and then while stirring with 30 parts of acetic anhydride. The mixture is then heated for half an hour on a boiling waterbath. After cooling, the reaction mixture is acidified with 6 parts of concentrated formic acid. A tanning solution is thus obtained which yields a pure white leather which is fast to light.

*Example 2*

60 parts of caustic soda solution of 36° Baumé strength are added to 200 parts of the 50 per cent solution, neutralized with caustic soda, of the condensation product derived from cresol sulphonic acid and formaldehyde; the mixture is then mixed in the manner described in Example 1 with 40 parts of benzoyl chloride and heated for half an hour on a boiling waterbath. The reaction product is acidified with 9 parts of formic acid. A tanning solution is obtained by means of which it is possible to obtain white leather fast to light.

*Example 3*

After the addition of 55 parts of caustic potash solution of 36° Baumé strength to 200 parts of the 50 per cent solution, neutralized with caustic potash, of the condensation product derived from cresol sulphonic acid and formaldehyde, there are added 56 parts of para-toluene sulphonic acid chloride. The mixture is heated for half an hour on a boiling waterbath and then acidified with 30 parts of concentrated formic acid. The resulting tanning solution may be directly employed for tanning unhaired animal hides.

Example 4

200 parts of the 50 per cent solution, neutralized with caustic soda solution, of the condensation product derived from cresol sulphonic acid and formaldehyde are mixed, after the addition of 80 parts of caustic soda of 36° Baumé strength, with 36 parts of beta-chlorpropionyl chloride slowly while cooling with ice. The mixture is then heated for ¾ hour on a boiling waterbath and acidified with 30 parts of formic acid. The resulting tanning solution is suitable for the direct tanning of unhaired animal hides.

Example 5

200 parts of the 50 per cent solution, neutralized with caustic soda solution, of the condensation product derived from cresol sulphonic acid and formaldehyde is stirred, after the addition of 50 parts of caustic soda solution of 36° Baumé strength, with 29 parts of phthalyl chloride while cooling with ice. The mixture is then heated for half an hour on a boiling waterbath and acidified with 20 parts of formic acid after cooling. The tanning agent obtained yields well plumped, pale leather fast to light.

Example 6

200 parts of the 50 per cent solution, neutralized with caustic soda, of the condensation product derived from cresol sulfonic acid and formaldehyde are diluted with 50 parts of water, mixed with 50 parts of caustic soda solution of 36° Baumé strength and then stirred with 64 parts of benzoic anhydride. The mixture is then heated for three hours on the waterbath and acidified with 20 parts of formic acid after cooling. A product is thus obtained having very good tanning properties.

Example 7

120 parts of the 50 per cent solution, neutralized with caustic soda, of the condensation product derived from phenol sulphonic acid and acetone are diluted with 50 parts of water and mixed with 40 parts of caustic soda solution of 36° Baumé strength. 36 parts of benzoyl chloride are then gradually stirred in while cooling with ice. The mixture is heated for half an hour on the waterbath and acidified with 16 parts of formic acid after cooling.

Example 8

200 parts of the 40 per cent solution, neutralized with caustic soda, of the condensation product derived from dihydroxydiphenyl sulphone and formaldehyde bisulphite and formaldehyde is gradually mixed, after the addition of 30 parts of caustic soda solution of 36° Baumé strength, with 30 parts of benzoyl chloride while cooling with ice. The mixture is heated for 15 minutes on the waterbath and, after cooling, acidified with 9 parts of formic acid.

Example 9

50 parts of cresol sulfonic acid are mixed with 100 parts of water and then neutralized with caustic soda solution. After adding 55 parts of caustic soda solution of 36° Baumé strength, 27 parts of acetic anhydride are gradually added while cooling with ice. The mixture is then heated for half an hour on the waterbath. 20 parts of formaldehyde are then allowed to flow in gradually and the mixture is heated for a further three hours. After cooling, the mixture is acidified with 22 parts of formic acid. The tanning solution thus obtained may be directly employed for tanning.

Example 10

100 parts of cresol sulphonic acid are heated for 4 hours on a boiling waterbath after the addition of 16 parts of glacial acetic acid and 20 parts of concentrated sulphuric acid. The reaction mixture is allowed to cool and 30 parts of 30 per cent formaldehyde are gradually stirred in at from 30° to 35° C. during the course of three hours. The resulting product is neutralized with 160 parts of caustic soda solution of 36° Baumé strength and acidified again with 30 parts of concentrated formic acid. The product thus obtained may be employed with advantage as a tanning agent.

What I claim is:

1. A process of producing synthetic tans which comprises acylating a condensation product of an aromatic hydroxy compound containing at least one sulphonic acid group and a carbonyl compound of low molecular weight with an organic substance selected from the group consisting of carboxylic and sulphonic acids free from olefinic bonds and their functional derivatives.

2. A process of producing synthetic tans which comprises heating a condensation product of an aromatic hydroxy compound containing at least one sulphonic acid group and a carbonyl compound of low molecular weight with an organic substance selected from the group consisting of carboxylic and sulphonic acids free from olefinic bonds and their functional derivatives at between 50° and 150° C.

3. A process of producing synthetic tans which comprises acylating a condensation product of an aromatic hydroxy sulphonic acid and a carbonyl compound of low molecular weight with an organic substance selected from the group consisting of carboxylic and sulphonic acids free from olefinic bonds and their functional derivatives.

4. A process of producing synthetic tans which comprises acylating a condensation product of an aromatic hydroxy compound containing at least one sulphonic acid group in a side chain and a carbonyl compound of low molecular weight with an organic substance selected from the group consisting of carboxylic and sulphonic acids free from olefinic bonds and their functional derivatives.

5. A process of producing synthetic tans which comprises acylating a condensation product of an aromatic hydroxy compound containing at least one sulphonic acid group and a carbonyl compound of low molecular weight with a saturated aliphatic acid of low molecular weight.

6. A process of producing synthetic tans which comprises acylating a condensation product of an aromatic hydroxy compound containing at least one sulphonic acid group and a carbonyl compound of low molecular weight with an aromatic sulphonic acid.

7. A process of producing synthetic tans which comprises acylating a condensation product of cresol sulphonic acid and formaldehyde with acetic anhydride.

8. A process of producing synthetic tans which comprises acylating a condensation product of cresol sulphonic acid and formaldehyde with phthalyl chloride.

9. A process of producing synthetic tans which comprises acylating a condensation product of cresol sulphonic acid and formaldehyde with para-toluene sulphonic acid chloride.

10. Synthetic tans comprising condensation products of aromatic hydroxy compounds containing at least one sulphonic acid group the hydroxyl groups of which compound are acylated with organic substances selected from the group consisting of carboxylic and sulphonic acids free from olefinic bonds, with carbonyl compounds of low molecular weight.

11. Synthetic tans comprising condensation products of aromatic hydroxy compounds containing at least one sulphonic acid group, the hydroxyl groups of which compound are acylated with a saturated aliphatic acid of low molecular weight with carbonyl compounds of low molecular weight.

12. Synthetic tans comprising condensation products of aromatic hydroxy compounds containing at least one sulphonic acid group, the hydroxyl groups of which compound are acylated with an aromatic sulphonic acid with carbonyl compounds of low molecular weight.

13. Synthetic tan comprising a condensation product of acetylated cresol sulphonic acid and formaldehyde.

14. Synthetic tan comprising a condensation product of a phthalic acid ester of cresol sulphonic acid and formaldehyde.

15. Synthetic tan comprising a condensation product of the para-toluene sulphonic acid ester of cresol sulphonic acid and formaldehyde.

16. A process of producing synthetic tans which comprises acylating an aromatic hydroxy compound containing at least one sulphonic acid group with an organic substance selected from the group consisting of carboxylic and sulphonic acids free from olefinic bonds and their functional derivatives and then condensing the acylated product with a carbonyl compound of low molecular weight under mild conditions.

17. A process of producing synthetic tans which comprises acylating an aromatic hydroxy compound containing at least one sulphonic acid group at between 50° and 150° C. with an organic substance selected from the group consisting of carboxylic and sulphonic acids free from olefinic bonds and their functional derivatives and then condensing the acylated products with a carbonyl compound of low molecular weight under mild conditions.

18. A process of producing synthetic tans which comprises acylating an aromatic hydroxy sulphonic acid with an organic substance selected from the group consisting of carboxylic and sulphonic acids free from olefinic bonds and their functional derivatives and then condensing the acylated product with a carbonyl compound of low molecular weight under mild conditions.

19. A process of producing synthetic tans which comprises acylating an aromatic hydroxy compound containing at least one sulphonic acid group in a side chain with an organic substance selected from the group consisting of carboxylic and sulphonic acids free from olefinic bonds and their functional derivatives and then condensing the acylated product with a carbonyl compound of low molecular weight under mild conditions.

20. Process of producing synthetic tans which comprises acylating cresol sulphonic acid with acetic anhydride and then condensing the acylated product with formaldehyde under mild conditions.

RICHARD ALLES.